(12) United States Patent
Williams

(10) Patent No.: US 7,012,918 B2
(45) Date of Patent: Mar. 14, 2006

(54) DIRECT DATA PLACEMENT

(75) Inventor: James B. Williams, Lowell, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 133 days.

(21) Appl. No.: 10/396,985

(22) Filed: Mar. 24, 2003

(65) Prior Publication Data

US 2004/0190516 A1 Sep. 30, 2004

(51) Int. Cl.
*H04L 12/56* (2006.01)
(52) U.S. Cl. ............... 370/389; 370/412; 370/463
(58) Field of Classification Search ......... 370/389, 370/412, 463, 465, 466, 471, 394; 709/250, 709/230, 236, 235
See application file for complete search history.

(56) References Cited

U.S. PATENT DOCUMENTS 6,334,153 B1 * 12/2001 Boucher et al. .......... 709/230

2004/0013117 A1 * 1/2004 Hendel et al. ............ 370/394
2004/0184459 A1 * 9/2004 Elzur ....................... 370/392

OTHER PUBLICATIONS

Shah et al. "Direct Data Placement Over Reliable Transports (Version 1.0)". draft-shah-iwarp-ddp-v1.0. Oct. 2002. pp. 1-35.*
Newton, Harry. "Newton's TELECOM Dictionary". 2001. pp. 280-281.*
Internet-Draft, a working document of the Internet Engineering Task Force (IETF); "Direct Data Placement over Reliable Transports," DDP Protocol Specification dated Oct. 21, 2002 by Hemal Shah et al.; http://www.ieft.org/lid-abstracts.html; expires Apr. 2003.

* cited by examiner

*Primary Examiner*—Ricky Ngo
*Assistant Examiner*—Derrick W Ferris
(74) *Attorney, Agent, or Firm*—Morrison & Foerster LLP

(57) ABSTRACT

A system comprising a host and a network interface card or host bus adapter. The host is configured to perform transport protocol processing. The network interface card is configured to directly place data from a network into a buffer memory in the host.

21 Claims, 3 Drawing Sheets

DIRECT DATA PLACEMENT

BACKGROUND

Transmission Control Protocol (TCP)/Internet Protocol (IP) is a networking protocol that provides communication across interconnected networks, between computers with diverse hardware architectures and various operating systems. The TCP/IP family of protocols track Internet addresses of nodes, routes outgoing messages and recognizes incoming messages. TCP is a connection-oriented, end-to-end transport layer protocol used to transfer data in a network. IP addresses packets and is the messenger protocol of the TCP/IP family of protocols.

A conventional network interface card (NIC) receives TCP/IP packets from a network and stores the packets in a network interface card memory. A conventional host operating system (OS) copies packets from the network interface card memory to a host memory. A host TCP/IP stack handles TCP/IP protocol processing of the TCP/IP packets. Copying data from the network interface card memory to the host memory may consume a large amount of the host's processing power and is referred to as "overhead."

The host system may use TCP/IP headers to determine a "connection" associated with each packet. If the TCP/IP packets are received from the network out of order, the host system may use TCP packet sequence numbers in TCP headers to put the TCP/IP packets in a proper order. The host system may also reassemble data (messages) that the network interface card receives in pieces.

As an alternative to the conventional host system, the host system may have a full TCP transport "offload," where the network interface card does all transport protocol processing instead of the host. This may enable zero copying of received data packets. The network interface card reassembles data packets, replaces out-of-place data packets, identifies the connection to which the packet belongs, and places the data in an appropriate buffer location in host memory. This full transport offload network interface card, however, may be fairly expensive, especially if the network interface card needs to handle a large number of connections and maintain context/connection state information for all connections. The network interface card needs to have high memory bandwidth to access context information to do transport processing. In addition, a host TCP/IP stack needs to be modified to account for the transport offload.

Direct Data Placement (DDP) is a developing protocol described in the "DDP Protocol Specification," published by an Internet Engineering Task Force (IETF) working group on Oct. 21, 2002 (hereinafter "DDP Specification"). DDP may enable an Upper Layer Protocol (ULP) to send data to a Data Sink without requiring the Data Sink to place the data in an intermediate buffer. When data arrives at the Data Sink, a network interface can place the data directly into the ULP's receive buffer. This may enable the Data Sink to consume substantially less memory bandwidth than a buffered model because the Data Sink is not required to move the data from an intermediate buffer to the final destination. This can also enable the network protocol to consume substantially fewer CPU cycles than if the CPU was used to move data, and remove the bandwidth limitation of being only able to move data as fast as the CPU can copy the data.

SUMMARY

The present application relates to a network interface card (NIC) or host bust adapter (HBA) and a method for direct data placement (DDP) without transport protocol processing offload. The system may have a number of advantages, such as reducing host overhead for copying data, reducing the cost of a network interface card and improving host and network interface card performance.

The system and methods described herein may modify the host network stack with practical modifications that do not break any fundamental assumptions. In contrast, host stack modifications that would support full, clean, and seamless TCP offload, i.e., for a network interface card to handle TCP/IP processing and data placement, may be significantly harder and more expensive to implement. A direct data placement-only network interface card may be considerably less expensive than a full TCP offload because context memory size and bandwidth is minimized for a direct data placement-only network interface card. Payload buffering is not required for a direct data placement-only network interface card or a full TCP offload network interface card.

The system and methods described above may also enable a desired usage mode, which would otherwise be difficult with a full TCP offload. The usage mode allows an initial connection of legacy protocol (such as Small Computer System Interface (SCSI), Small Computer System Interface over Internet Protocol (iSCSI) or Network File System (NFS)) to be established to an associated well-known port number. Then in-band negotiation is performed to upgrade the connection to use direct data placement. After successful negotiation of direct data placement, the connection may transition to DDP mode. Backward compatibility may be difficult to maintain without this capability.

An aspect of the application relates to a system comprising a host system and a network interface card (NIC). The host system comprises a host transport protocol processing stack and a memory. The network interface card is configured to receive packets from a network, send a header of each packet to the host transport protocol processing stack, and directly place a payload of each packet in the host memory.

Another aspect relates to a network interface card comprising a direct data placement engine and a memory storing connection state information. The direct data placement engine is configured to read a header of a packet received from a network, access the connection state information, determine whether a payload of the packet can be directly placed in a host memory, send the header to a host protocol processing stack, and directly place the payload in the host memory.

Another aspect relates to a method comprising: reading a header of a packet received from a network; determining whether packet data is authorized to be directly placed in a host memory; if the packet data is authorized to be directly placed in the host memory, placing the packet data directly in the host memory and sending a packet header to a host transport protocol processing stack; and if the packet data is not authorized to be directly placed in the host memory, sending the packet to the host transport protocol processing stack.

The details of one or more embodiments are set forth in the accompanying drawings and the description below. Other features and advantages will be apparent from the description and drawings, and from the claims.

DETAILED DESCRIPTION

Figure 1:
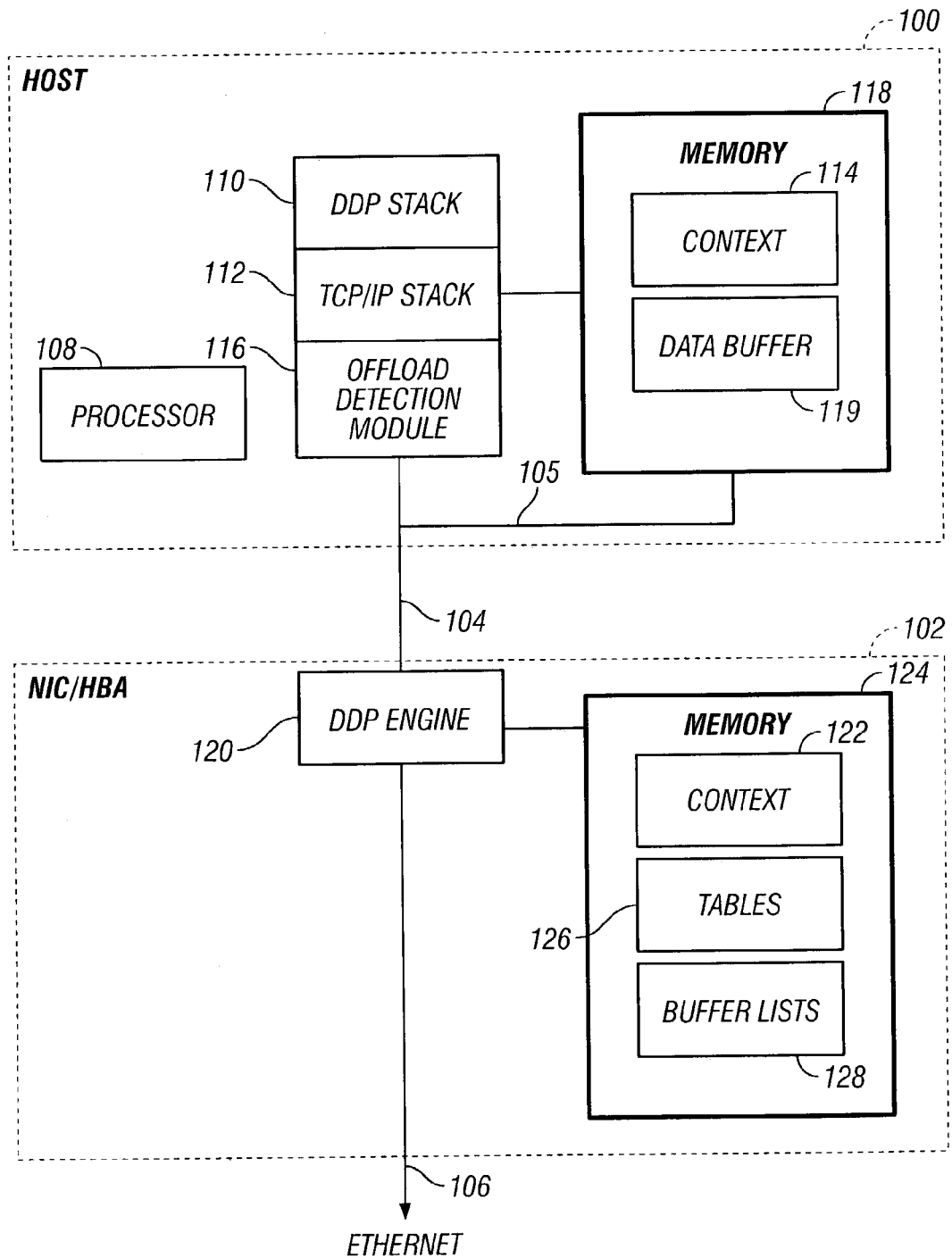
FIG. 1 illustrates a host system and a network interface card (NIC), a bus and a network connection.

FIG. 1 illustrates a host system 100 and a network interface card (NIC) or host bus adapter (HBA) 102, a bus 104 and a network connection 106. The bus 104 may be a Peripheral Component Interface (PCI) bus, a PCI-X bus, a Small Computer System Interface (SCSI) bus or some other type of bus. The network connection 106 may be coupled to an Ethernet network with servers, user computers, storage devices, network attached storage (NAS), storage area networks (SANs), routers and other devices.

The host system 100 may include a direct data placement (DDP) stack 110, a Transmission Control Protocol/Internet Protocol (TCP/IP) stack 112, an offload detection module 116 and a memory 118. A host CPU or processor may execute the direct data placement (DDP) stack 110, TCP/IP stack 112, and offload detection module 116. The DDP stack 110 and offload detection module 116 may be separate from the TCP/IP stack 112 or may be combined with the TCP/IP stack 112.

The host memory 118 has a context storage 114 that stores context or connection state information, which is described below. The context storage 114 may be a part of the memory 118 or separate from the memory 118.

The host memory 118 may have a buffer 119 that stores packet data payloads 200 (FIG. 2 described below) that are associated with a particular host application or connection, i.e., source and destination Internet Protocol (IP) addresses and port numbers. The memory 118 may have a set of buffers for a set of connections.

The network interface card 102 may include a direct data placement (DDP) engine 120, a memory 124 and a network (e.g., Ethernet) connection 106. The DDP engine 120 may include firmware and/or hardware, such as a processor. The network interface card memory 124 may include a context cache or storage 122, tables, and buffer lists.

Packet

Figure 2:
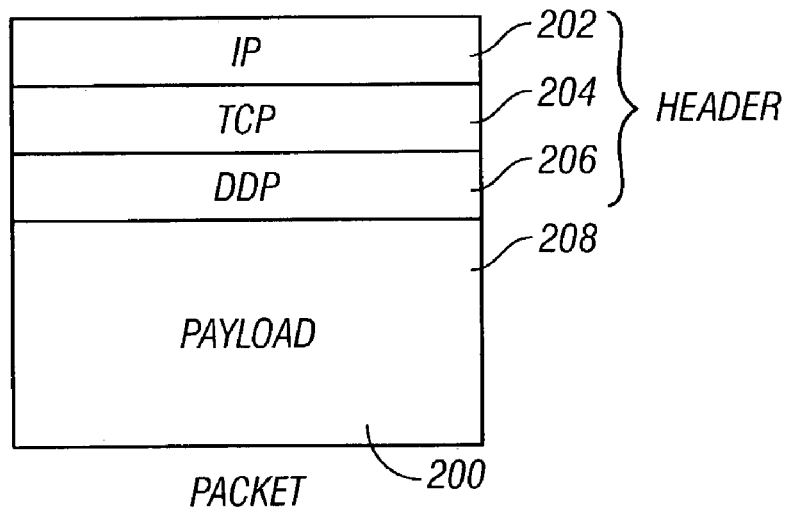
FIG. 2 illustrates a packet that the network interface card of FIG. 1 may receive from the Ethernet connection.

FIG. 2 illustrates a packet 200 that the network interface card 102 may receive from the network connection 106. The packet 200 may include an IP header 202, a TCP header 204, a DDP header 206 and payload data 208. The IP header 202 may include a source IP address and a destination IP address. The TCP header 204 may include a source port ID/number, a destination port ID/number, a checksum, a packet sequence number and other control information. The IP and TCP headers 202 and 204 provide sufficient information on where the packet payload 208 is supposed to be stored in the host buffer 119.

The DDP header 206 may indicate permission or authorization for the network interface card 102 to directly write data payloads 208 associated with a connection to the buffer 119. The packet 200 shows a Direct Data Placement (DDP) protocol run over a TCP/IP network.

NIC Receives Packets in Order

Figure 3:
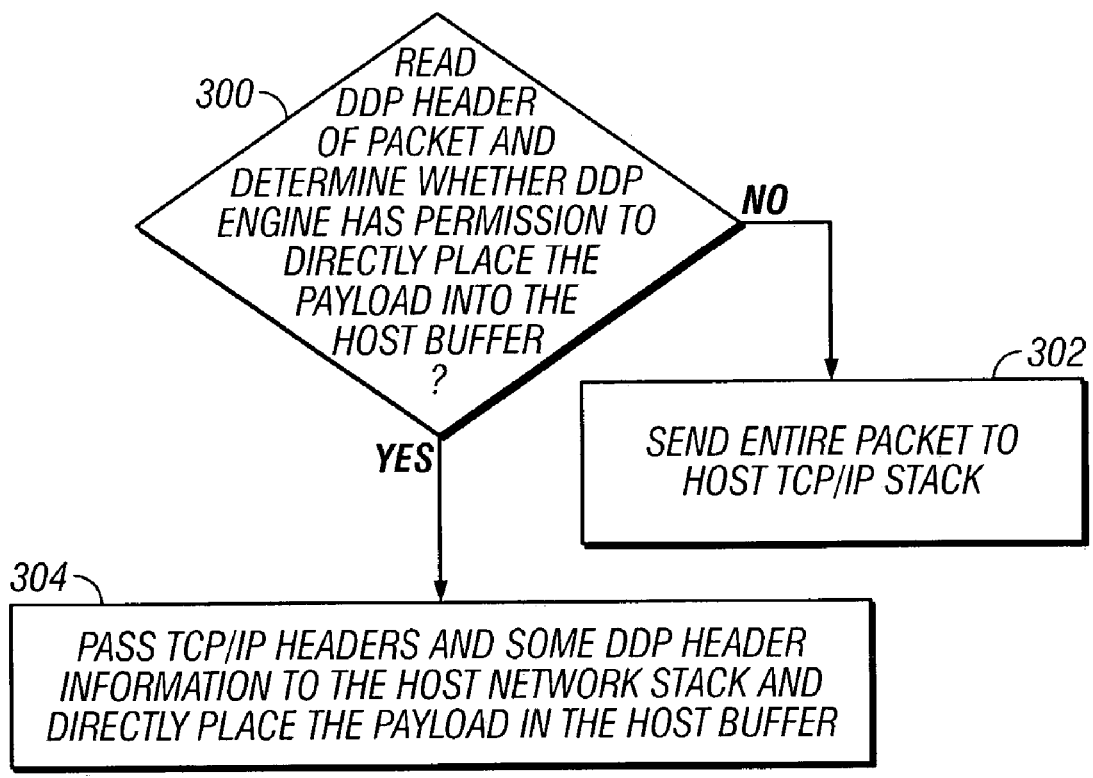
FIG. 3 illustrates a method of direct data placement with the system of FIG. 1.

FIG. 3 illustrates a method of direct data placement with the system of FIG. 1. When the network interface card 102 receives packets in order via the Ethernet connection 106, the network interface card 102 has sufficient context information in storage 122 to directly place the packet payloads 208 in the host buffer 119. The network interface card 102 may transfer two types of packets from the network connection 106 to the host TCP/IP stack 112: header-only packets; and header and payload packets.

The DDP engine 120 reads the DDP header 206 in 300 of FIG. 3 and determines whether the DDP engine 120 has permission to directly place the payload 208 (associated with a particular connection) into the host's buffer 119 via a bus or line 105. If not, the DDP engine 120 may pass the whole packet 200 to the host TCP/IP stack 112 in 302.

If direct placement is permitted, the DDP engine 120 of the network interface card 102 passes the IP header 202, TCP header 204 and some DDP header information to the host network TCP/IP stack 112 for processing. The DDP engine 120 separates payload data 208 from headers 202, 204, 206. The DDP engine 120 places the payload data 208 directly into the buffer 119 in the memory 118 of the host system 100 according to information in the IP header 202, TCP header 204 and DDP header 206. Thus, the network interface card 102 may do direct data placement (DDP) in the host buffer 119, but not transport (e.g., TCP) offload.

The network interface card DDP engine 120 may set a flag bit in the DDP header 206 sent to the host TCP/IP stack 112. The host's offload detection module 116 may detect the flag bit for a header-only packet transferred from the network interface card 102 to the host system 100 and acknowledge that the network interface card 102 directly placed data in the host memory buffer 119.

The network interface card DDP engine 120 may check the TCP sequence number in the TCP header 204 to determine if the packet 200 is a "valid" packet, which means the packet is "in sequence" (in order). If the packet 200 is a retransmission of an old packet, the packet may be invalid and invalid packets will be dropped. If the packet 200 is out of sequence, the DDP engine 120 sends the entire packet to the host TCP/IP stack 112.

Context Information Stored in Network Interface Card

The DDP engine 120 may identify a connection to which the packet is associated by accessing minimal TCP context information stored in the network interface card context storage 122. The context storage 122 may maintain a total of, for example, 16 to 32 bytes of context information (described below) per connection, in contrast to 256 to 512 bytes of context information per connection for full TCP offload (if TCP processing is handled by a network interface card).

The minimal TCP "context" or "connection state" information may include for each DDP connection: (a) a local IP address and port number; (b) a remote IP address and port number; (c) a sequence number of the next TCP packet expected by the connection; and (d) a protection ID (e.g., PTag). The protection ID is a mechanism for protecting the host memory buffer 119 and checking all accesses to the host memory buffer 119 for permission. The protection ID indicates whether the network interface card 102 has permission to write data directly to the host buffer 119.

The DDP Specification describes a PTag (protection tag), which is an example of a protection ID for protecting the memory buffer 119 from unauthorized writes. There is a PTag associated with each buffer 119 in the host memory 118, and another PTag associated with the connection. If the two PTags match, then the connection is associated with that buffer 119.

The context information may include a STag (steering tags) for each buffer in the memory 118. STags are described in the DDP Specification. The DDP header 206 (FIG. 2) may include a STag. The STag identifies a Data Sink's tagged ULP buffer, such as the host buffer 119. The STag directs the DDP engine 120 to write data to the buffer 119 referenced by the STag.

Figure 4:
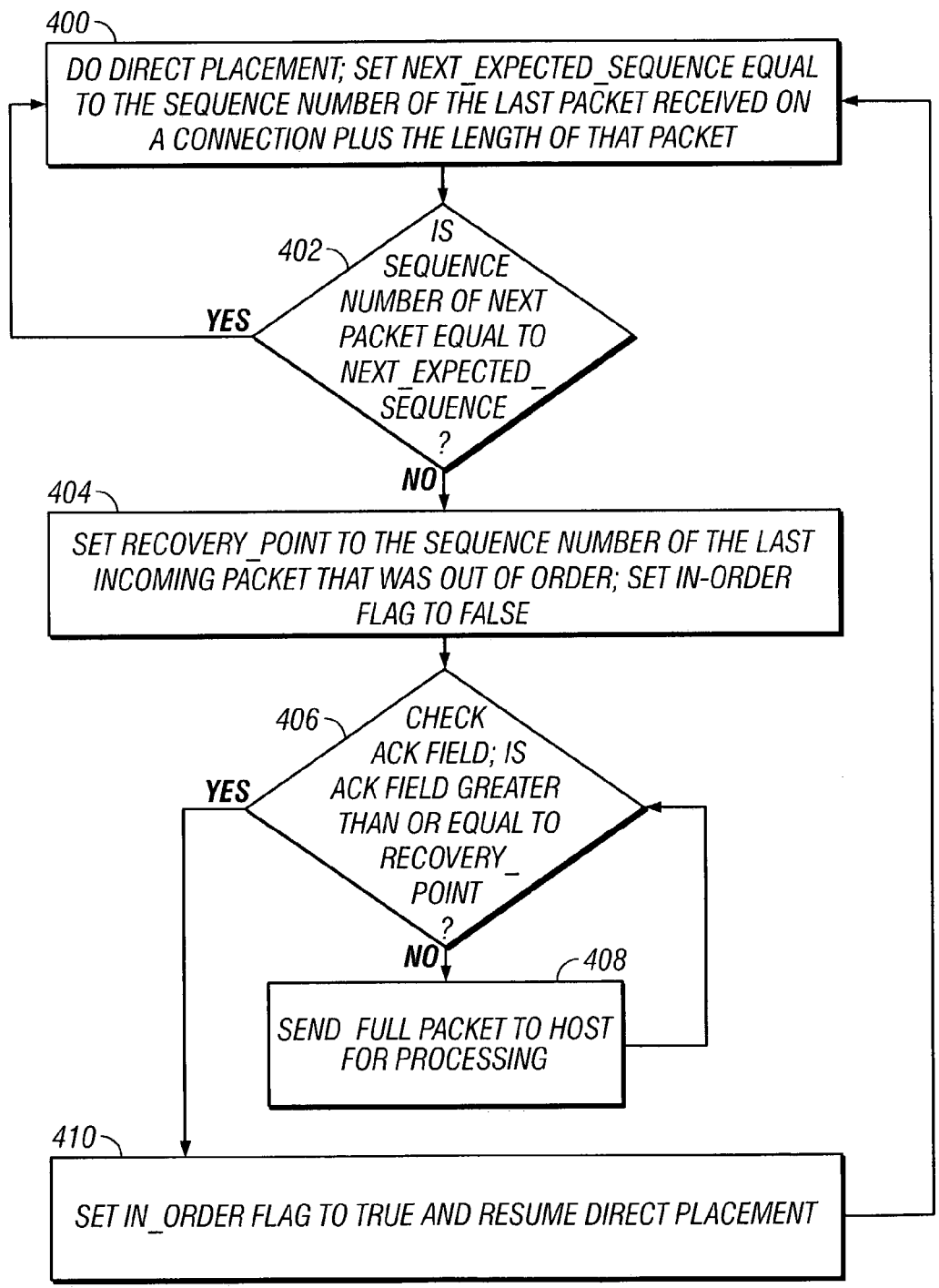
FIG. 4 illustrates a method of determining whether packets are in order, handling out-of-order packets and recovering after packets are back in order.

The context information may further include a next_expected_sequence, a recovery_point and an in-order flag, as described below with FIG. 4.

The memory 124 may store a source IP address, a destination IP address, a source port number, and a destination port number (collectively called a "four-tuple") for each connection for which the network interface card 102 is doing direct data placement. Four-tuples are used to identify incoming packets and associate each packet with a connection. An implementation has a plurality of four-tuples stored in a hash table 126 or other associative lookup structure in the network interface card memory 124, instead of the network interface card context cache 122. The output of the hash table 126 may be a pointer or other means to access the context in the context cache 122 for the identified connection. Thus, the four-tuple is stored in the network interface card memory 124 and is part of the "context" associated with a connection. But a different mechanism, such as hash tables 126, is used to store the four-tuple, so the four-tuple is not part of what is referred to as the "connection context."

The network interface card's context storage 122 may also maintain a small amount of DDP context information for each connection, including a current buffer (start address of a host buffer 119), a current offset (memory address offset from the buffer start address), and bytes remaining to be transferred to the buffer 119, since DDP "blocks" may span multiple TCP "segments."

Host Stacks

The host network stack 112 may continue to do all TCP/IP protocol processing, other than copying payloads 208 of connections authorized for network interface card 102 to handle DDP to destination buffers 119. Copying, however, may be a majority of the host network stack's work if the host does not have a network interface card 102 that does direct data placement. As an example, 50% host CPU offload may be achieved by having the network interface card 102 do direct data placement.

If the network interface card DDP engine 120 stops doing DDP because of an invalid packet, the host TCP/IP stack 112 may send a signal to instruct the network interface card DDP engine 120 to resume DDP.

The host DDP stack 110 may process information in the DDP header 206 and handles DDP protocol functions, as described in the DDP Specification.

Dropped Packet

If the network drops a packet, the network interface card 102 may (a) stop DDP and note where in a sequence a packet is missing or (b) resume direct placement on a subsequent packet. When the missing packet is retransmitted across the Ethernet network and reaches the network interface card 102, the network interface card 102 may send the retransmitted packet to the host stack 112, which would copy the retransmitted packet to its intended destination in the memory 118.

Alternatively, the network interface card 102 may be able to process and transport the retransmitted packet if the network interface card 102 has context information devoted to tracking gaps in a packet sequence and TCP acknowledgements (ACKs) for packets. A TCP ACK notifies the network interface card 102 that everything in a sequence up to a particular packet has been received by a destination buffer 119. The network interface card 102 may watch the TCP ACKs to determine when DDP may be resumed.

NIC Receives Packets Out of Order

The network interface card context storage 122 may maintain the following state information for each connection:

next_expected_sequence 32 bit sequence number recovery_point 32 bit sequence number in_order flag: TRUE or FALSE FIG. 4 illustrates a method of determining whether packets are in order, handling out-of-order packets and recovering after packets are back in order. The following algorithm may be used on each received packet 200. Each incoming TCP packet 200 contains a sequence number SEQ and a length LEN. Next_expected_sequence represents the sequence number the network interface card 102 expects to see in the next packet and indicates if the next packet is in order. The next_expected_sequence may always be set to the sequence number of the last packet received on a connection plus the length of that packet in 400.

next_expected_sequence=SEQ+LEN;

The network interface card 102 compares the sequence number of each packet with next_expected_sequence in 402. If the sequence number of the next packet is not equal to next_expected_sequence, the packet is out of order in 404. The recovery_point is set to the sequence number of the last incoming packet that was out of order, and is not changed when subsequent packets are received in order. The in_order flag is set to false in 404.

```
if ( SEQ != next_expected_sequence)
    // this is an out-of-order packet
    recovery_point = SEQ
    in_order = FALSE
```

On each packet transmitted to the host 100 by the network interface card 102, the network interface card 102 checks an ACK field to determine if the network interface card 102 can restart "in order" processing in 406. When the network interface card 102 sees an outgoing packet containing an ACK greater than or equal to the recovery_point in 410, the network interface card 102 knows that all packets up to that sequence number have been received. The network interface card 102 also knows that it has seen all packets since that point in order. Therefore, if the network interface card 102 had stopped direct placement due to out of order packets being received, the network interface card 102 may now resume direct placement in 410.

```
if ( ACK >= recovery point)
    in_order = TRUE
if ( in_order is TRUE)
    do direct placement
else
``` pass full packet to host for processing in 408.

A number of embodiments have been described. Nevertheless, it will be understood that various modifications may be made without departing from the spirit and scope of the application. For example, the description above assumes an underlying TCP/IP network, but other types of protocols, standards, packet types and networks may be used. For example, the systems and methods described herein may be applied to Simple Computer Telephony Protocol (SCTP), Virtual Interface (VI) over TCP/IP, Fibre Channel or iSCSI.

In addition, although DDP from the "DDP Specification" is described herein, the host and network interface card may use other information in a packet to enable the network interface card to directly place packet payloads into appropriate locations in a host buffer and reduce the amount of copying by the host of data from a network interface card intermediate buffer. Accordingly, other embodiments are within the scope of the following claims.

What is claimed is:

1. A system comprising:
   a host system comprising a host transport protocol processing stack and a memory; and
   a network interface card configured to receive packets from a network, send a header of each packet to the host transport protocol processing stack for processing without performing transport offload, and directly place a payload of each packet in the host memory;
   wherein the network interface card checks an acknowledgement field of a packet sent to the host transport protocol processing stack;
   wherein if the acknowledgement field is greater than or equal to a recovery sequence number, the network interface card places the payload of the packet directly into the host memory and sends the header of the packet to the host transport protocol processing stack; and
   wherein if the acknowledgement field is less than the recovery sequence number, the network interface card sends the entire packet to the host transport protocol processing stack.

2. The system of claim 1, wherein the transport protocol processing stack is a Transmission Control Protocol/Internet Protocol processing stack.

3. The system of claim 1, wherein the host system memory stores connection state information accessible to the transport protocol processing stack.

4. The system of claim 1, wherein the host system further comprises a direct data placement stack configured to process direct data placement headers sent by the network interface card.

5. The system of claim 1, wherein the host system further comprises an offload detection module configured to detect whether the network interface card directly placed a packet payload in the host memory.

6. The system of claim 1, wherein the host memory comprises a plurality of buffers, each buffer being associated with an Internet Protocol address and port connection.

7. The system of claim 1, wherein the network interface card is configured to send an entire packet to the host transport protocol processing stack if the network interface card is not authorized to directly place a payload of the packet in the host memory.

8. The system of claim 1, wherein the network interface card is configured to send an entire packet to the host transport protocol processing stack if the network interface card determines that the packet is out of order.

9. The system of claim 1, further comprising a network coupled to the network interface card.

10. A network interface card comprising:
    a memory storing connection state information; and
    a direct data placement engine capable of receiving a packet from a network, reading a header of a packet received from the network, accessing the connection state information, determining whether a payload of the packet can be directly placed in a host memory, sending the header to a host protocol processing stack for processing without performing transport offload, and directly placing the payload in the host memory;
    wherein the connection state information comprises
       a local Internet Protocol address and port number,
       a remote Internet Protocol address and port number,
       a sequence number of the next packet expected by the connection, and
       a protection identification that authorizes the network interface card to directly place the payload in the host memory.

11. The network interface card of claim 10, wherein the packet comprises a Transmission Control Protocol header, an Internet Protocol header and a direct data placement header.

12. The network interface card of claim 10, wherein the connection state information further comprises an steering tag.

13. The network interface card of claim 10, wherein the memory further stores a source Internet Protocol address, a destination Internet Protocol address, a source port number, and a destination port number for each connection for which the network interface card directly places data into the host memory.

14. The network interface card of claim 13, further comprising a hash table storing the source Internet Protocol address, destination Internet Protocol address, source port number, and destination port number.

15. A host bus adapter comprising firmware and a memory configured to store connection state information, the firmware being configured to read a header of a packet from a network, access the connection state information, determine whether a payload of the packet can be directly placed in a host memory, send the header to a host transport protocol processing stack for processing without performing transport offload, and directly place the payload in the host memory;
    wherein the host bus adapter checks an acknowledgement field of a packet sent to the host transport protocol processing stack;
    wherein if the acknowledgement field is greater than or equal to a recovery sequence number, the host bus adapter places the payload of the packet directly into the host memory and sends the header of the packet to the host transport protocol processing stack; and
    wherein if the acknowledgement field is less than the recovery sequence number, the host bus adapter sends the entire packet to the host transport protocol processing stack.

16. A method comprising:
    reading a header of a packet received from a network;
    determining whether packet data is authorized to be directly placed in a host memory;
    if the packet data is authorized to be directly placed in the host memory, placing the packet data directly in the host memory and sending a packet header to a host transport protocol processing stack;
    if the packet data is not authorized to be directly placed in the host memory, sending the packet to the host transport protocol processing stack;
    checking an acknowledgement field of a packet sent to the host transport processing stack;

if the acknowledgement field is greater than or equal to a recovery sequence number, then begin placing payloads directly in the host memory and sending packet headers to the host transport processing stack; and if the acknowledgement field is less than a recovery sequence number, then send the packet to the host transport processing stack.

17. The method of claim 16, further comprising identifying a connection associated with a packet.

18. The method of claim 16, further comprising accessing connection state information to determine whether packet data is authorized to be directly placed in a host memory.

19. The method of claim 16, further comprising accessing connection state information to find a location for directly placing packet data in the host memory.

20. The method of claim 16, further comprising:

determining whether the packet is in sequence by comparing a sequence number of the packet with an expected sequence number;

if the packet is out of sequence, sending the packet to the host transport processing stack; and if the packet payload is in sequence, placing the payload directly in the host memory and sending a packet header to a host transport processing stack.

21. The method of claim 16, further comprising maintaining a next expected sequence variable, a recovery sequence number an in order flag.

* * * * *